Patented May 29, 1928.

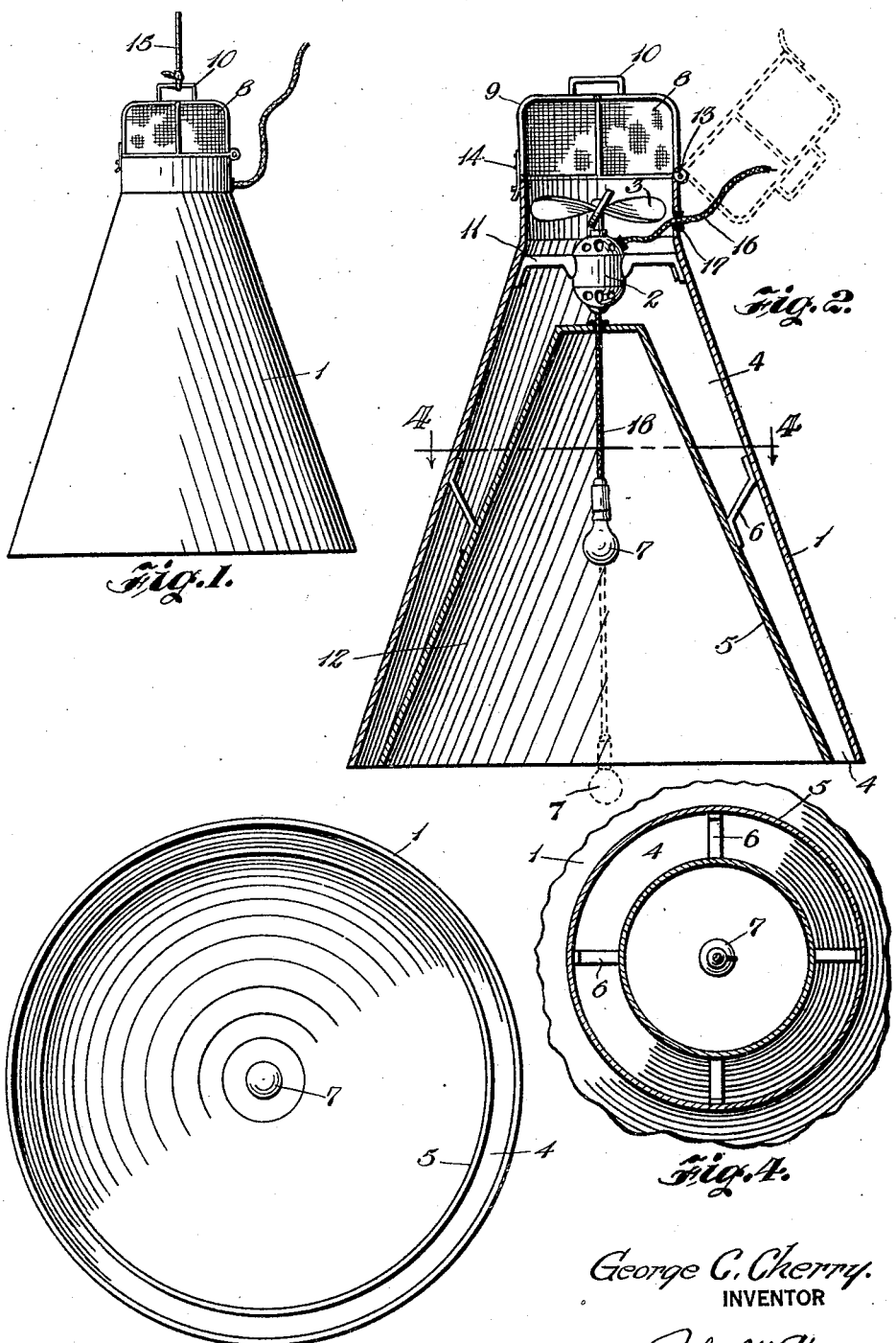

1,671,404

UNITED STATES PATENT OFFICE.

GEORGE C. CHERRY, OF DALLAS, TEXAS.

MOSQUITO AND INSECT TRAP.

Application filed August 4, 1927. Serial No. 210,593.

The invention relates to an improved trap for mosquitoes or other insects, and more particularly to that type of trap in which a light or other attracting means is employed to bring the insects into the proximity of the trap, whereupon a blast from a fan or other source of suction serves to forcibly draw the insects into the trap. The object of the invention is to simplify and improve this type of insect trap.

An illustrative embodiment of the invention is shown in the accompanying drawing, in which:—

Fig. 1 is a side elevation showing the trap suspended from the ceiling of a room by a cord.

Fig. 2 is a vertical sectional view of the same.

Fig. 3 is a bottom view, and

Fig. 4 is a sectional view on line 4—4 of Fig. 2.

In the drawings, the reference numeral 1 denotes an outer cone, in the top of which is provided a chamber which houses a motor 2, supported from the cone 1 by means of suitable brackets 11. The motor 2 serves to drive a fan 3, of any suitable construction, and so mounted as to create suction through a narrow channel 4 which is formed between the outer cone 1 and an inner cone 5 spaced therefrom by means of suitable brackets 6.

Within the dead air space 12 at the interior of the inner cone is suspended a dim light 7 for attracting the bugs or insects into range of the suction created by the fan 3 through channel 4.

As the insects pass through the draft below the trap in the effort to reach the light, they are forcibly drawn through the channel 4 and upwardly and inwardly into a screen cap 8 formed at the top of the trap. The screen, of course, permits an unobstructed draft for the fan, and at the same time effectually retains the insects until such time as they are to be removed.

To provide for removal of the insects, the stiff frame 9 of the cap may be hinged at 13 to the top of the outer cone, and may be tilted back, as shown in dotted lines, to permit removal of the insects. Also, a catch 14 is preferably provided to prevent undesired opening of the top 8.

Where the trap is designed to be suspended from a ceiling or other elevated position, it may be provided with a handle 10 to which a suitable cord 15 is attached.

The motor 2 and light 7 may be supplied with current through a cord 16 leading from any suitable source of power and passing through suitable insulation 17 within the wall of cone 1, a drop cord 18 passes from the motor 2 through the top of the inner cone 5 to the lamp 7. Where the device is employed outside, a suitable storage battery may be used as the source of current, or a small dynamo driven by a gas engine may be used.

The trap may be used for destroying various kinds of insects, as mosquitoes, candle bugs and other insects which are attracted by a light. For field use, the light is lowered to the position shown in dotted lines. If desired, the lamp 7 may be dispensed with, for certain types of insects, as for example, flies, and edible bait of some kind may be substituted. In any event, the attracting means serves to bring the insect into range of the suction created by the fan, and they are thereby drawn into the trap and destroyed. Preferably the cones 1 and 5 converge toward their bottoms in order that the channel 4 may diminish in size from top to bottom, thereby creating a more effective draft at the lower portion.

Obviously the details of the device may be various to suit particular needs without departing from the spirit of the invention, and the trap may be furnished in any desired sizes.

What I claim is:—

An insect trap comprising a pair of spaced cones, one located within the other and a trap chamber at the upper portion of the outer cone, insect attracting means located within the inner cone, and a fan adjacent the upper portion of the outer cone and positioned between said trap chamber and said inner cone for creating a suction between adjacent surfaces of said cones whereby the insects are drawn into said trap chamber.

In testimony whereof I affix my signature.

GEORGE C. CHERRY.